No. 706,959. Patented Aug. 12, 1902.
F. J. KNOX.
WATER GAGE ATTACHMENT.
(Application filed Jan. 7, 1902.)
(No Model.)

Witnesses
C. F. Kilgore
V. R. Holcomb

Inventor
Frank J. Knox,
by Harry R. Williams
Attorney

THE NORRIS PETERS CO., PHOTO-LITHO., WASHINGTON, D. C.

UNITED STATES PATENT OFFICE.

FRANK J. KNOX, OF HARTFORD, CONNECTICUT.

WATER-GAGE ATTACHMENT.

SPECIFICATION forming part of Letters Patent No. 706,959, dated August 12, 1902.

Application filed January 7, 1902. Serial No. 88,727. (No model.)

*To all whom it may concern:*

Be it known that I, FRANK J. KNOX, a citizen of the United States, residing at Hartford, in the county of Hartford and State of Connecticut, have invented certain new and useful Improvements in Water-Gage Attachments, of which the following is a specification.

This invention relates to a device that is designed to be applied to a water-gage to facilitate observation. The device is particularly intended for attachment to a water-gage that is illuminated by an artificial light placed behind the glass, as is the water-gage of a common steam-automobile.

The object of the invention is to provide a simple, light, and cheap attachment that can be readily applied to any common water-gage so as to screen the direct rays from the flame of the artificial illuminant behind the glass from the eyes of the observer and so direct the rays that the glass will appear a solid color if full of water, or will appear very bright with a fine contrasting longitudinal stripe if empty, or if partly full will appear to have a solid color up to the level of the water and bright with a fine colored stripe above the water.

The embodiments of the invention illustrated by the accompanying drawings have a translucent screen extending vertically between the glass and the light, with a practically opaque stripe directly behind and parallel with the center of the glass, and means that direct the rays of light upon the glass and screen all rays from the eyes of the observer except those that are thrown upon the glass or pass through the glass.

Figure 1:
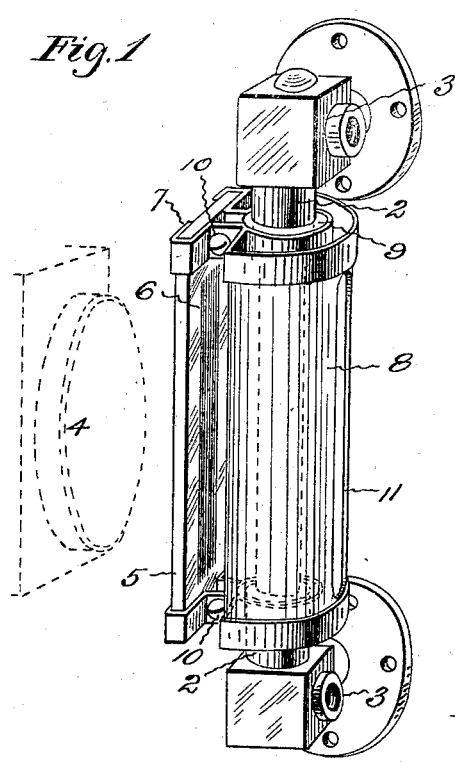
Figure 2:
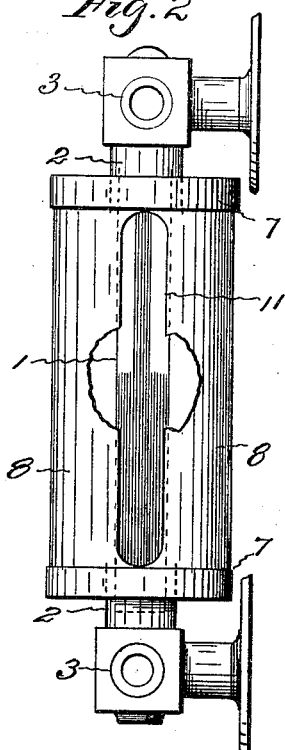
Figure 4:
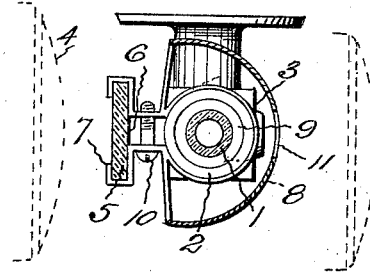
Figure 3:
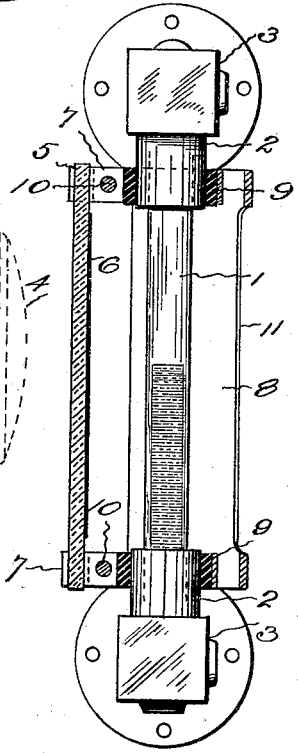
Figure 5:
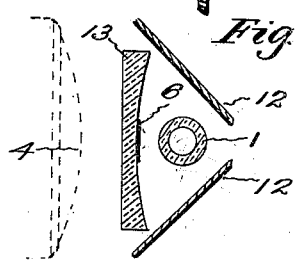

Figure 1 of the drawings shows a perspective view of one of the devices attached to a water-gage. Fig. 2 is a front elevation, Fig. 3 is a central vertical section, and Fig. 4 is a transverse section, of the same. Fig. 5 is a transverse section of a modified form of the invention, and Fig. 6 is a transverse section of another modification.

The transparent water-glass 1 is held, as usual, in the stuffing-boxes 2 of the upper and lower gage-arms 3, which are connected with the boiler in a common manner. The dotted lines 4 indicate the lens of the lamp, which provides the illumination back of the glass.

A translucent screen 5, preferably a piece of ground glass with an opaque or practically opaque stripe 6 of any striking color in or on the glass, is held by clamps 7 between the glass and the light, with the stripe parallel with the axis of the glass. These clamps extend around portions of the upper and lower gage-arms and support the reflector 8. Rubber or other packings 9 are placed inside of the clamps in order to cushion the device, and the clamps are drawn together so as to hold the parts in position by screws 10. The reflector is formed of a curved piece of metal with a central slot 11, which is substantially the width of the diameter of the glass. The inside of this reflector is preferably polished, plated, or coated with some light-reflecting substance, so as to reflect the rays of light back upon the glass and screen. As shown in Fig. 5, the reflector instead of being a curved piece of metal may be formed of two flat plates of glass 12 or other material arranged at an angle with each other, with an open space between them at the front. This reflector hides the rays of light from the lamp from the eyes of the observer, except those which are thrown back upon the glass or pass through and are seen through the opening at the front. If desired, the translucent screen 13 back of the glass may be formed with an angular or curved front surface, as shown in Fig. 5. The rays of light which pass through the screen at the back and which are thrown back onto the glass by the reflector in front bring the glass into strong relief, and the colored stripe on the screen so acts with the rays of light that if the glass is full of water it will appear, looking from the front through the opening in the reflector, as a solid body having the color of the stripe. If the glass is empty, the reflection and refraction are such that the glass appears bright and glowing except for a narrow colored stripe, and if the glass is partially filled with water the portion that contains water appears as a solid body having the color of the stripe, while the portion that is empty appears bright with a narrow colored stripe. By means of this construction the direct rays from the light are screened from the eyes of the observer and so directed upon the glass that at a glance and without close inspection he can determine whether the glass is full, partially full, or is empty of water.

Figure 6:
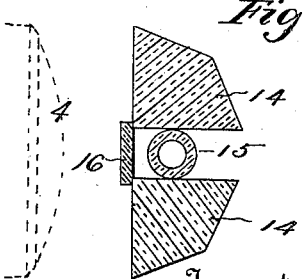

In the modification illustrated in Fig. 6 the same effect is produced by employing the prisms 14, which are so cut and arranged that rays of light entering from behind will be thrown at right angles to their original direction upon the glass 15. The translucent screen 16, that is between these prisms, is provided with a stripe of color, which causes the filled portion of the tube to appear a solid and the empty portion to exhibit only a stripe of color.

A device embodying this invention is particularly applicable to the water-gage of a steam-automobile, and while its use is very convenient in the day-time it is specially serviceable at night, as it enables the chauffeur to observe the amount of water in the boiler without leaving his seat for the purpose of scrutinizing the glass. This is of value for the reason that it is often inconvenient to stop in the dark and get down and examine the glass. Many machines with the ordinary form of water-gage have been seriously injured by reason of an oversupply and many by an undersupply of water while being used at night on account of the failure to readily distinguish the level of the water in the glass.

I claim as my invention—

1. An attachment having means for clamping to a water-gage and a reflector having a narrow central opening in front of the gage-glass and arranged to throw light backward toward the gage-glass, substantially as specified.

2. An attachment having means for clamping to a water-gage, a screen with an opaque stripe parallel with and back of the gage-glass, and a reflector extending on each side of the glass and having reflecting-walls that converge toward a narrow opening in front of the glass and arranged to throw light backward toward the front of the glass, substantially as specified.

3. An attachment having means for clamping to a water-gage, an opaque stripe parallel with and back of the gage-glass and a reflector extending each side of the glass and having reflecting-walls that converge toward a narrow opening in front of the glass and arranged to throw light backward toward the front of the glass, substantially as specified.

4. An attachment having means for clamping to a water-gage, a translucent screen with an opaque stripe back of and parallel with the gage-glass, and an opaque reflector with a central opening in front of the glass, substantially as specified.

FRANK J. KNOX.

Witnesses:
H. R. WILLIAMS,
V. R. HOLCOMB.